US012595857B2

(12) United States Patent     (10) Patent No.:    US 12,595,857 B2

Rauch et al.                   (45) Date of Patent:       Apr. 7, 2026

(54) ASSEMBLY FOR PREVENTING A BACKFLOW

(71) Applicant: KSB SE & Co. KGaA, Frankenthal (DE)

(72) Inventors: Gregor Rauch, Frankenthal (DE); Dieter Hanewald, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/710,683

(22) PCT Filed: Nov. 17, 2022

(86) PCT No.: PCT/EP2022/082297
§ 371 (c)(1),
(2) Date: May 16, 2024

(87) PCT Pub. No.: WO2023/089040
PCT Pub. Date: May 25, 2023

(65) Prior Publication Data
US 2025/0043876 A1     Feb. 6, 2025

(30) Foreign Application Priority Data

Nov. 17, 2021   (DE) ..................... 10 2021 129 947.0
Jan. 27, 2022   (DE) ..................... 10 2022 101 922.5

(51) Int. Cl.
*F16K 15/04*      (2006.01)
*F16K 27/02*      (2006.01)

(52) U.S. Cl.
CPC .......... *F16K 15/04* (2013.01); *F16K 27/0209* (2013.01)

(58) Field of Classification Search
CPC .................................................... F16K 15/042
See application file for complete search history.

(56) References Cited

U.S. PATENT DOCUMENTS

| | | | | |
|---|---|---|---|---|
| 536,245 | A | * | 3/1895 | Webster ................ F16K 15/042 |
| | | | | 137/512.1 |
| 4,187,874 | A | * | 2/1980 | Essebaggers ......... F16K 15/042 |
| | | | | 137/512.1 |
| 2013/0139913 | A1 | * | 6/2013 | Haeckel ................ F16K 15/042 |
| | | | | 137/512 |

FOREIGN PATENT DOCUMENTS

| | | | |
|---|---|---|---|
| DE | 20 2010 010 935 U1 | 11/2010 | |
| DE | 10 2018 122 252 A1 | 3/2020 | |
| DE | 10 2020 113 290 A1 | 11/2021 | |
| EP | 3 269 519 B1 | 9/2019 | |
| WO | WO-2022034324 A1 * | 2/2022 | ....... H01L 21/67017 |

OTHER PUBLICATIONS

International Search Report (PCT/ISA/210) issued in PCT Application No. PCT/EP2022/082297 dated Mar. 6, 2023 with English translation (4 pages).
German-language Written Opinion (PCT/ISA/237) issued in PCT Application No. PCT/EP2022/082297 dated Mar. 6, 2023 with English translation (10 pages).

* cited by examiner

*Primary Examiner* — P. Macade Nichols
(74) *Attorney, Agent, or Firm* — Crowell & Moring LLP

(57) ABSTRACT

An assembly that prevents a backflow includes an element. The element releases a flow in a flow direction and which prevents a flow opposite to the flow direction. The element is arranged in a chamber which has stops. The chamber is formed by a single-piece wall. The element is integrated into the chamber in a form-fitting manner.

17 Claims, 3 Drawing Sheets

30

ASSEMBLY FOR PREVENTING A BACKFLOW

CROSS REFERENCE TO RELATED APPLICATIONS

This application claims priority under 35 U.S.C. § 119 from German Patent Application No. 102021129947.0 dated Nov. 17, 2021, and 102022101922.5 dated Jan. 27, 2022, the entire disclosures of which are herein expressly incorporated by reference.

BACKGROUND

The disclosure relates to an assembly for preventing a backflow, comprising at least one element which releases a flow in a flow direction and prevents a flow opposite the flow direction, wherein the element is arranged in a chamber and has at least one stop.

Backflow preventers allow fluids to flow in only one direction in pipes, fittings and pumps. When the flow direction is reversed, they close automatically, and they likewise open automatically when the through flow direction is permitted. A backflow preventer is intended to avoid raised pipes and tanks from emptying during downtimes or to protect pumps from backflow and from reverse pressure waves. Moreover, they are used in the heating sector to prevent unwanted thermal upcurrents and to separate different heating circuits.

Examples of backflow preventers are check valves and swing check valves as well as diaphragm-type backflow preventers. Swing check valves are used principally at medium and larger nominal diameters; for smaller nominal diameters, check valves are more frequently used.

Check valves are fittings and prevent the suction line from running empty, after the pump is switched off for example, making it unnecessary to prime the pump before restarting.

DE 10 2020 113 290 A1 describes a valve having a backflow preventer, wherein the main valve and the backflow preventer are arranged in a flow channel and wherein the backflow preventer has a valve seat and a closing element for opening and closing the valve seat. The valve entails an enormous flow deflection, which produces a particularly high pressure loss.

Spring-loaded check valves can be used in virtually any installation position. Relative to the swing check valve, they have larger losses in terms of pressure levels since the flow is deflected more. Spring-loaded check valves are generally preferred for smaller nominal diameters.

DE 20 2010 010 935 U1 discloses a backflow preventer for gaseous and liquid media, having a casing, a nozzle body arranged centrally in the casing, and a nozzle ring coaxially surrounding the nozzle body, wherein an annular flow channel formed between the casing and the nozzle body can be closed by means of an annular blocking element, which is mounted in such a way in the casing by means of at least one spring element that the blocking element can be moved by the flow of the medium between an open position, in which it exposes the flow channel, and a blocking position, in which it closes the flow channel.

Known backflow preventers generally have spring elements, which seal off the backflow counter to the flow direction. Such spring elements are subject to the known hysteresis phenomena and are subject to wear with increasing time in use. Particularly for fluids which may contain proportions of solids, such backflow preventers are not very suitable since they may promote blockages.

SUMMARY

Given this background, it is the underlying object of the disclosure to specify an assembly for preventing a backflow which can be used universally and at the same time reliably prevents a backflow. At the same time, the assembly should produce as little pressure loss as possible and straighten the flow as effectively as possible. In addition, the assembly should be as compact as possible in design and ensure high reliability. Moreover, the assembly should allow simple assembly and be easily accessible for maintenance work. Furthermore, the assembly should be distinguished by production costs that are as low as possible and should be capable of adaptation to individual requirements.

According to the disclosure, this object is achieved by an assembly for preventing a backflow. Preferred variants can be found in the additional independent main claims, the dependent claims, the description and the drawings themselves.

According to the disclosure, the chamber is formed by a single-piece wall, and the element is integrated into the chamber in a form-fitting manner.

This form-fitting integration is brought about by fitting the element into the chamber. This ensures that the element cannot leave the chamber. In addition, it would also not be possible to retrofit the element into the chamber. Thus, the wall of the chamber is in the way of the element at least to the extent that the element cannot leave the chamber.

It is advantageous if the element is introduced in a captive manner into the chamber. This means that the element can neither be retrofitted nor can the element be removed from the chamber.

This special form-fitting integration can preferably be achieved by means of generative manufacture. In this case, the element and the wall of the chamber are formed simultaneously in one working step, as a result of which the element cannot be removed and/or subsequently fitted.

Ideally, the wall, including the stops, is formed simultaneously in one piece. As a result, the wall and each individual stop are preferably produced generatively, in one work cycle and in such a way as to be inseparable.

For this purpose, the chamber has two openings for a fluid to flow through. The fluid flows through the chamber and, in the process, also inevitably flows around the element at the same time. In this case, the wall of the chamber around the openings bounds the element in a form-fitting manner, as a result of which fluid flow without high resistance or pressure loss is achieved but the element cannot leave the chamber through any opening.

In a particularly advantageous variant, the assembly is in the form of a disk or blanking disk for assembly between flanges, which has at least one chamber with an element for preventing a backflow.

Such a disk can have at least one chamber for through flow in one direction, wherein its axis of rotation is aligned parallel to the axis of symmetry of the disk cylinder.

In a particularly advantageous variant of the disclosure, the assembly for preventing a backflow comprises a multiplicity of chambers, as a result of which the assembly has a high proportion of the cross-sectional area through which flow can occur and consequently produces little pressure loss. In this case, an element which blocks through flow counter to the desired flow direction is integrated into each chamber.

In particular, the flow through the chambers takes place in parallel, in the sense of simultaneously, and, for the sake of making a distinction, not serially.

Ideally, all the chambers are aligned parallel to the flow direction in the assembly. This leads to a low-turbulence intervention into the flow regime and generates a particularly small pressure loss.

In a particularly advantageous variant of the disclosure, the assembly for preventing a backflow has symmetrical positioning of the chambers. In this case, the openings of the chambers are arranged symmetrically in a plan view of the assembly. This can be circular or rectangular or square positioning of the chambers, for example.

In a particularly advantageous variant of the disclosure, the or each chamber has a honeycomb structure. Such a honeycomb shape can preferably be in the form of a hexagonal cross section. Where many chambers are arranged adjacent to one another, the hexagonal design of the cross section allows arrangement without gaps, making it possible to achieve a maximum area for the through flow of fluid and thus also a maximum fluid through flow.

The chamber is preferably arranged in or on a channel through which flow can occur. The chamber can thus be arranged at the start or in the center or at the end or at any position between the start and the end of the channel. In this case, the length of the channel is limited by the thickness of the assembly.

For this purpose, the chamber is ideally designed as a channel through which flow can occur. For this purpose, the chamber can be embodied as a channel-type conduit. In this case, the chamber can have a round or rectangular or square or trapezoidal or polygonal or cloverleaf-shaped cross section or a cross section of complex shape. Such cross-sectional shapes are ideal for generative manufacture since only round cross sections can be produced with conventional tools, e.g. drills. In one variant of the disclosure, the cross-sectional shapes of the flow chamber can vary over the length of the channel.

As a particular preference, one channel and/or each channel has elements for variation of the pressure, in particular the static pressure. These elements can, for example, vary the cross section of the channel by the release of additional cross sections or preferably by the action of special roughness characteristics on the flow.

As a particular advantage, the elements for variation of the pressure achieve avoidance of cavitation phenomena in the channel itself and/or in the subsequent flow portion behind the assembly.

In one variant of the disclosure, the chamber is designed as a curved channel. In this case, the channel has a profile which is advantageous for the production of a desired flow regime. For this purpose, the chamber preferably has a complex shape, which can ideally be produced generatively. Curved channels cannot be produced conventionally, e.g. by means of drills.

The element is preferably designed as a body, in particular as a ball. Moreover, the element can be regarded as a central component part of the assembly for preventing a backflow. The ball advantageously has an at least slightly larger diameter than the diameter of the openings of the chamber, thereby making it possible to ensure sealing in the case of a reversal of the flow.

In an alternative variant of the disclosure, the element can be designed as a cube or as a cuboid or as a truncated cone or as a pyramid or as a complex body, such that it interacts advantageously with the cross section of the opening in the chamber for sealing and for the avoidance of a backflow of the fluid.

In an alternative variant of the disclosure, the element can additionally comprise a spring element. The element is preferably combined with a spring element. Such a combination is preferably embodied as a connection. For this purpose, the element, including the spring element, can be manufactured generatively and simultaneously.

In one possible embodiment of the disclosure, the element is formed in one piece with the spring element.

The spring element can advantageously be embodied as a spiral spring or as a leaf spring.

The spring element advantageously has a connection to the wall of the chamber. The element thereby receives guidance and is no longer freely movable within the chamber. It is advantageous that, with the flow, the element can move exclusively on a guided path between the stop in the flow direction and the stop opposite the flow direction.

By means of generative manufacture, it is ideally possible to generate spring stiffness levels that are different and, at the same time, adapted to the task of the assembly for preventing a backflow.

In the chamber, the assembly for preventing a backflow preferably has a stop for the element opposite the flow direction for sealing and avoiding a backflow. Ideally, the stop for the element opposite the flow direction comprises a contact surface which is shaped as the negative of the element. Moreover, the surface can be shaped around the stop in such a way that the element preferentially finds a position on the stop and efficiently prevents a backflow.

In a particularly advantageous variant of the disclosure, the chamber of the assembly for preventing a backflow has a stop for the element in the flow direction. Ideally, the element is positioned in such a way that the fluid flow can flow around the element without flow separation and turbulence.

The stop for the element in the flow direction preferably has centering in the form of an arched shape in the flow direction. In this case, the arched shape is advantageously of convex design, as a result of which the element assumes a defined position within the stop solely through the flow of the fluid. In a particularly advantageous variant of the disclosure, the element is designed as a ball-shaped body and is positioned by the fluid in that part of the stop which arches furthest outward as long as the fluid is flowing in the flow direction.

Ideally, the stop in the flow direction has strut-type elements, which are connected in a star shape at a central point and thus form a flow divider. Three struts with a convex curvature, each arranged at an offset of 120°, preferably form the stop in the flow direction. As a result, the element is positioned centrally within the stop, and the fluid can flow around the element without significant turbulence and pressure losses.

In an alternative variant of the disclosure, it is also possible for six struts with a convex curvature at the same distance from one another to form the stop in the flow direction.

The chamber preferably has a cavity. In this case, the cavity is a hollow space through which flow can occur, which is bounded by the two stops and the single-piece wall of the chamber. The cavity surrounds the element, and therefore the element is arranged within the cavity. The form or structure of the hollow space through which flow can occur is adapted by means of the generative design to the setting for the pressure difference or flow regime.

Ideally, the element and the single-piece wall, including at least one stop, have a metallic surface. As regards the avoidance of a backflow, the metallic surfaces have an average roughness which can achieve sealing. In this case, the ball-shaped element rests so smoothly and sealingly in the stop that excellent sealing can be achieved. Here, the average roughness Ra is less than 6.4 μm, preferably less than 3.2 μm, in particular less than 1.6 μm.

The particularly smooth metallic surfaces are preferably achieved by electropolishing. The average roughness of the surfaces is reduced by the electropolishing. Roughness peaks are worn away more quickly than roughness troughs since, when electropolishing in mineral acid mixtures, a transport-limiting polishing layer is formed in front of the surface, which promotes the removal of roughness peaks. The nano-roughness is likewise reduced. In this case, brightening is performed electrochemically. The brightness is a result of the roughness in the region of fractions of the wavelength of visible light.

Ideally, the average roughness of the metallic surfaces can be set in a targeted manner by means of the duration of electropolishing and thus adapted to the task of the assembly.

Ideally, the element is integrated in a form-fitting manner into the chamber by integrative and thus generative manufacture. In the context of additive manufacture, the chamber with a single-piece wall and two stops is preferably formed in a complex shape around the element, which is formed simultaneously. In a preferred variant, the casing of the chamber is produced in one piece, and the element in the interior of the casing has a larger diameter than the two stops, something that can be produced generatively, in contrast to conventional manufacture, in which retrofitting of the element into the casing is not possible.

In a particularly preferred variant, a ball-shaped element is embedded within the cavity of the chamber, e.g. in the form of an oval bubble, bounded by a stop opposite the flow direction, into which a channel opens, and furthermore bounded by a stop in the flow direction in the form of a flow divider with three star-shaped struts.

Ideally, the entire assembly with the multiplicity of chambers, each comprising one element, is manufactured generatively. By means of additive manufacture, the complex design of the assembly for preventing a backflow can be implemented in an advantageous manner. Moreover, it is also possible for individually adapted individual pieces to be prepared according to requirements and extremely quickly.

In the method for producing an assembly for preventing a backflow, the element is, according to the disclosure, produced in a chamber simultaneously with the single-piece wall by selective action of radiation on a buildup material.

Ideally, the arrangement for preventing a backflow is manufactured additively. By virtue of this special manufacturing technique, the chamber or chambers, each with one element, can be produced flexibly, with an extremely low consumption of material and very quickly. Particularly the element within the cavity, wherein the element is embodied so as to be movable within the cavity to ensure fluid flow in just one preferred flow direction, can advantageously be achieved by means of the additive manufacturing technique.

An additively manufactured assembly for preventing a backflow has been produced by an additive manufacturing method. The term "additive manufacturing method" comprises all manufacturing methods in which a material is applied layer by layer and in this way three-dimensional elements and single-piece walls are produced. Here, the layer by layer buildup takes place under computer control from one or more liquid or solid materials according to predetermined dimensions and shapes. During the buildup, physical or chemical hardening or melting processes take place. Typical materials for 3D printing are plastics, synthetic resins, ceramics, metals, carbon materials and graphite materials.

For the formation of the assembly, selective laser melting and cladding, also referred to as deposition welding, are used, in particular. In an alternative variant of the disclosure, extrusion in combination with the application of fusible plastic is also a method that can be used.

In selective laser melting, the assembly for preventing a backflow is produced by a method in which, first of all, a layer of a buildup material is applied to a substrate. The buildup material for producing the assembly is preferably metallic powder particles. In a variant of the disclosure, ferrous and/or cobalt-containing powder particles are used for this purpose. These can contain additives such as chromium, molybdenum or nickel. The metallic buildup material is applied in powder form in a thin layer to a plate. The powdered material is then melted fully in a local area at the desired locations by means of radiation, and, after solidification, a solid material layer is formed. The substrate is then lowered by the amount of one layer thickness, and more powder is applied. This cycle is repeated until all the layers have been produced and the finished assembly has formed.

As radiation, it is possible, for example, to use a laser beam which generates the assembly from the individual powder layers. The data for the guidance of the laser beam are produced by means of software on the basis of a 3D CAD body. As an alternative to selective laser melting, it is also possible to use an electron beam (EBN).

In deposition welding or cladding, the assembly is produced by a method which coats a starting piece by welding. Deposition welding uses a welding filler material in the form of a wire or a powder to build up a volume which provides a particularly intricate and optimized shape of the assembly.

In one variant of the disclosure, the assembly is produced by an additive manufacturing method in which a grid of points consisting of a fusible plastic is applied to a surface. A load-bearing structure is produced by extrusion by means of a nozzle and subsequent hardening by cooling at the desired position. The assembly is usually built up by repeatedly traversing a working plane line by line and then shifting the working plane upward with a stacking effect, giving rise to the assembly with at least one chamber.

According to the disclosure, the assembly is used as a restrictor module and/or as a flow divider in a system through which fluid flows.

In one preferred variant, the assembly is embodied as a blanking disk for assembly between flanges. This enables the assembly to be assembled and disassembled particularly quickly and also reliably.

In an advantageous variant of the disclosure, the assembly is used to bridge pressure gradients and/or to produce swirl-free, symmetrical flow profiles in the pipe.

Further features and advantages of the disclosure can be obtained from the description of exemplary embodiments with reference to the drawings and from the drawings themselves.

DETAILED DESCRIPTION

Figure 1:
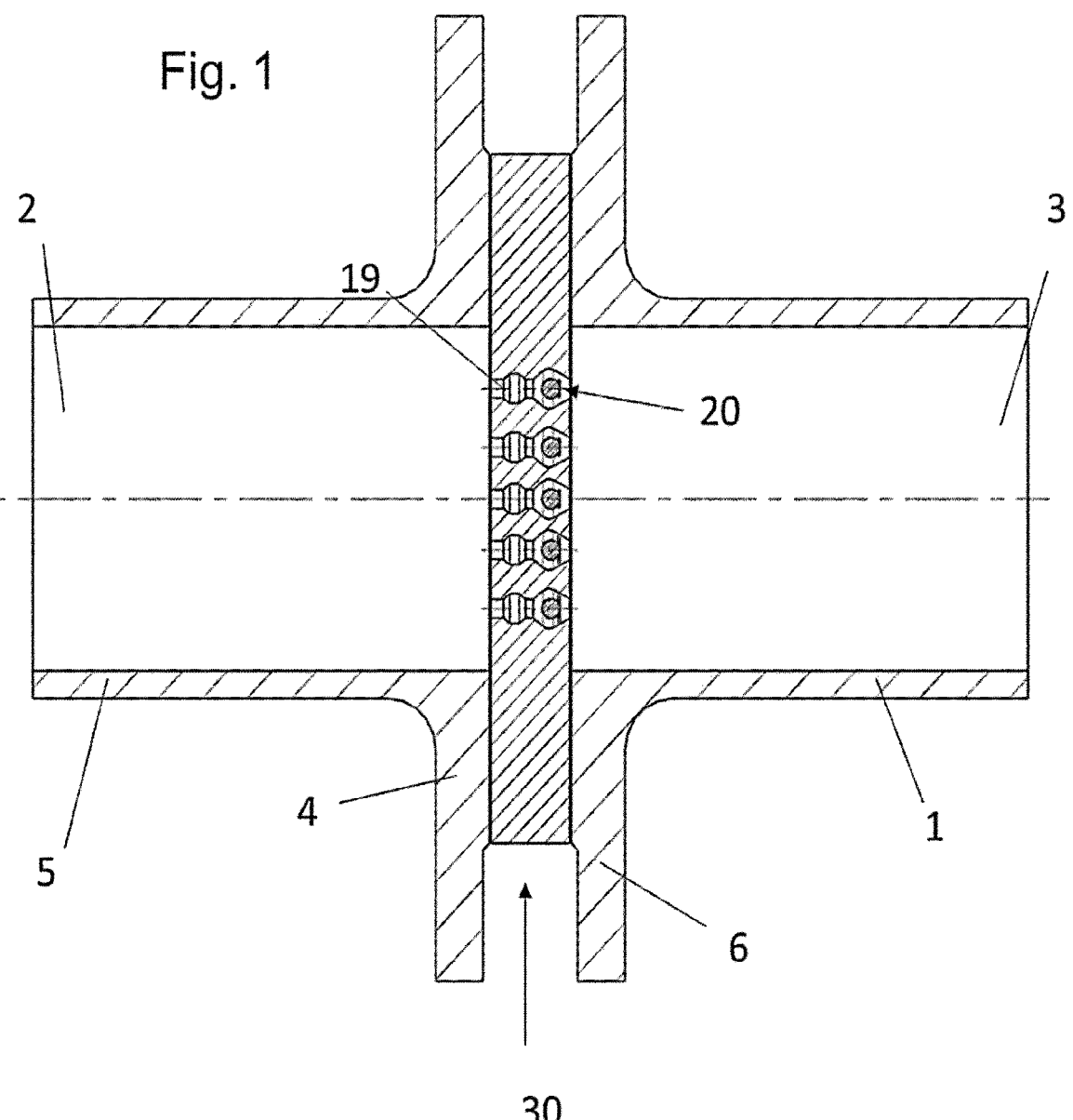
FIG. 1 shows a section through an assembly in an illustrative embodiment between flanges.

FIG. 1 shows a section through an assembly 30 for preventing a backflow in a variant embodiment for assembly between flanges. The pipes 1 and 5 each have a pipe cross section 2 and 3 through which flow can occur and which each end at a flange 4, 6. The assembly 30 for preventing a backflow is mounted between the flanges 4 and 6.

In the cross-sectional area illustrated, the sectioned assembly 30 has five chambers 20, which are positioned centrally and symmetrically. A respective chamber 20 is arranged at the end of a short channel 19, through which flow can occur. Here, the assembly 30 ensures the flow of a fluid in only one direction. The symmetrical arrangement of the chambers 20 leads to a uniform and swirl-free flow regime of the fluid flowing through.

Figure 2:
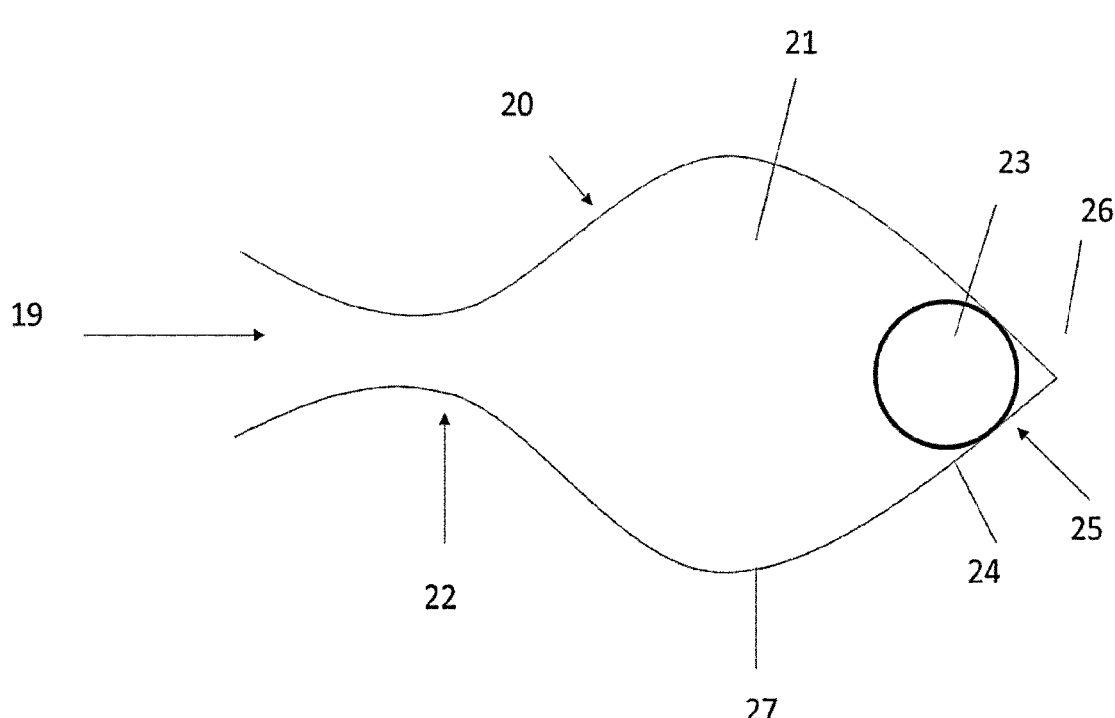
FIG. 2 shows a section through a chamber.

FIG. 2 illustrates a section through a chamber 20, which is designed to prevent a backflow. The chamber 20 comprises a cavity 21 as a hollow space through which flow can occur and in which the element 23 is arranged. In this illustrative variant embodiment, the element 23 is embodied as a ball.

The conduit-type channel 19 opens into the chamber 20 via the stop 22 opposite the flow direction. The cavity 21 extends from the stop 22, which surrounds the inflow opening, opposite the flow direction as far as the stop 25 in the flow direction, which surrounds the outflow opening. The stop 25 in the flow direction is formed by strut-type elements 24, which have an arched shape in the flow direction and thus hold the element 23 in a flow-optimized position in the case where fluid is flowing through.

The stop 25 in the flow direction is adjoined by a flow outlet 26. In the illustrated variant embodiment of the disclosure, the chamber 20 is arranged at the end of the channel 19.

The element 23 is enclosed in the cavity 21 by generative manufacture. In the context of additive manufacture, the cavity 21, surrounded by the single-piece wall 27, is formed with two stops 22 and 25, with the element 23 being formed simultaneously. Retrofitting of the element 23 into the cavity 21 is not possible since the diameter of the element 23 is greater than the diameter of the two stops 22, 25, and therefore the chamber 20 in its complex shape can advantageously be produced by generative manufacture.

In the case of a reversal of the flow of the fluid, the element 23 is moved through the cavity 21 from the position in the stop 25 in the flow direction to the stop 22 opposite the flow direction and, in the process, closes the path for the fluid into the channel 19. A backflow of the fluid is thereby prevented.

Figure 3:
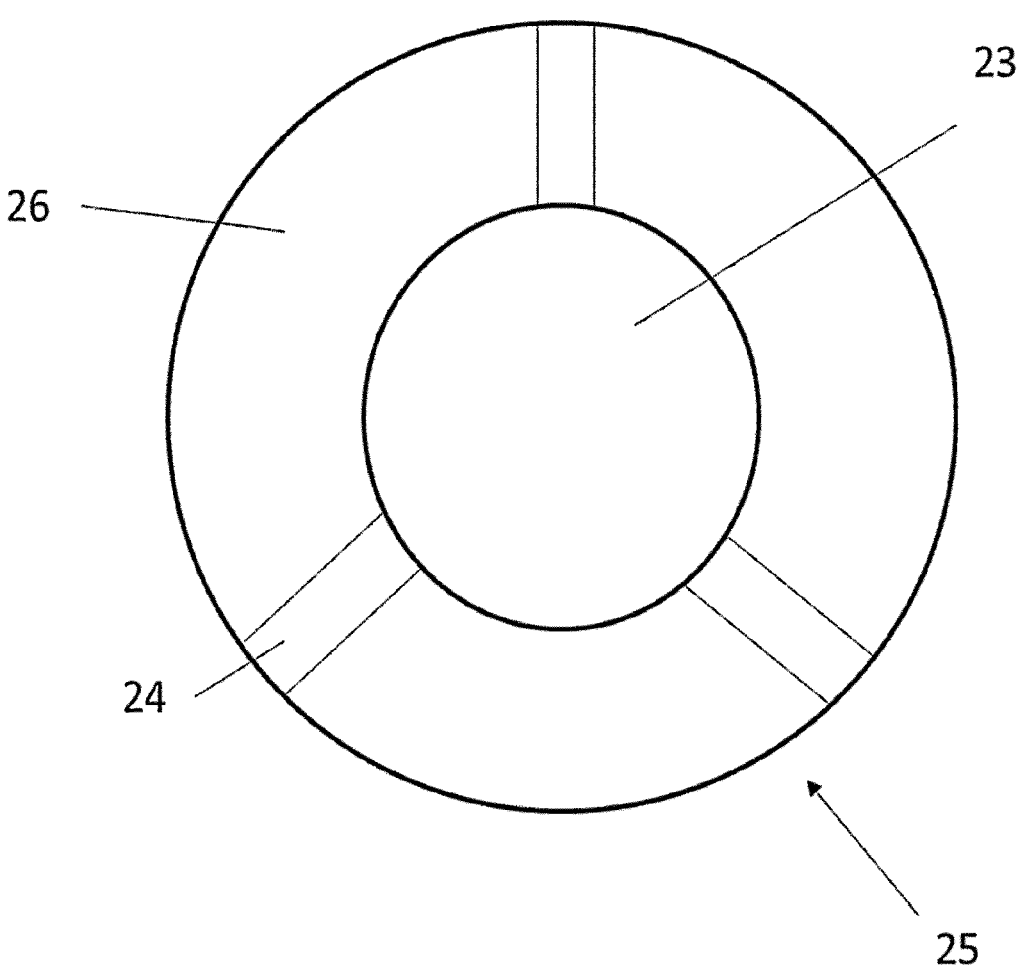
FIG. 3 shows a view of the stop in the flow direction with the element positioned.

FIG. 3 shows an illustrative view of the stop 25 in the flow direction with the element 23 positioned. The stop 25 in the flow direction has three strut-type elements 24 in the flow direction, which are connected in a star shape at a central point and thus form a flow divider. The three strut-type elements 24 have a convex curvature in the flow direction and are arranged offset by 120° in each case. As a result, the element 23 is positioned centrally within the stop 25, and the fluid can flow around the element 23 without significant turbulence and pressure losses.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. An assembly that prevents a backflow, comprising:
   an element which releases a flow in a flow direction and which prevents a flow opposite to the flow direction, wherein
   the element is arranged in a chamber, which has stops,
   the chamber is formed by a single-piece wall,
   the element is integrated into the chamber in a form-fitting manner,
   the plurality of chambers are arranged in or on a channel through which flow occurs, and
   the channel has elements configured to vary the pressure.

2. The assembly as claimed in claim 1, wherein the wall is formed integrally with the stops.

3. The assembly as claimed in claim 2, wherein the assembly comprises a plurality of chambers.

4. The assembly as claimed in claim 3, wherein the plurality of chambers of the assembly are structurally arranged to form a parallel through flow.

5. The assembly as claimed in claim 4, wherein the plurality of chambers are symmetrically positioned.

6. The assembly as claimed in claim 1, wherein the element is formed as a ball.

7. The assembly as claimed in claim 6, wherein the chamber has a stop for the element in the flow direction.

8. The assembly as claimed in claim 7, wherein the stop in the flow direction has centering to ensure low-flow positioning of the element in a state in which there is full through flow.

9. The assembly as claimed in claim 8, wherein the stop has strut-type elements.

10. The assembly as claimed in claim 9, wherein the chamber has a cavity.

11. The assembly as claimed in claim 10, wherein the assembly is designed for generative manufacture.

12. The assembly as claimed in claim 11, wherein the element and the single-piece wall having the stop have a metallic surface, the average roughness Ra of which is less than 6.4 μm.

13. The assembly as claimed in claim 12, wherein the average roughness Ra is less than 3.2 μm.

14. The assembly as claimed in claim 12, wherein the average roughness Ra is less than 1.6 μm.

15. A method for producing the assembly as claimed in claim 1, wherein the element is produced in a chamber simultaneously with the single-piece wall by selective action of radiation on a buildup material.

16. The method as claimed in claim 15, wherein the element and/or the wall have the stop are electropolished.

17. A method comprising:
   using the assembly as claimed in claim 1 as a restrictor module and/or as a flow divider in a system through which flow occurs.

\* \* \* \* \*